Figure 1:
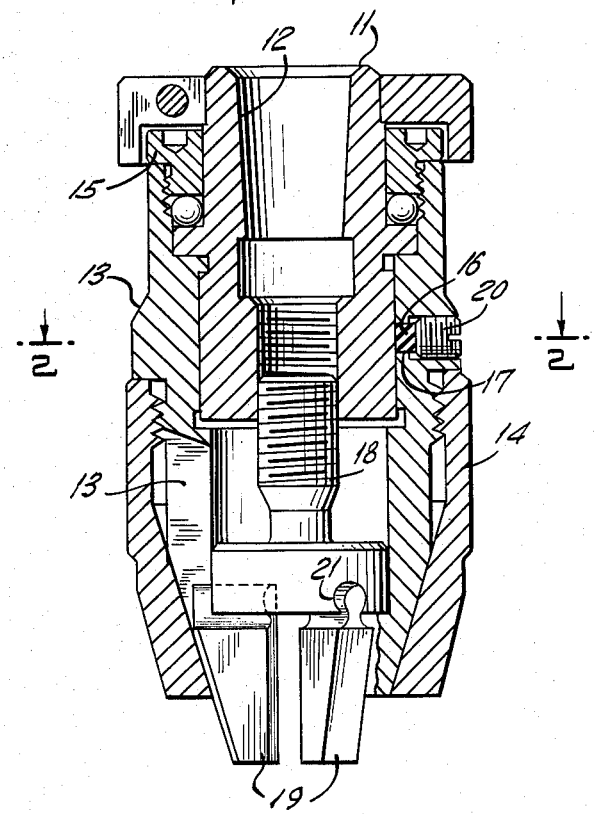

April 5, 1966

G. H. RÖHM 3,244,428

HEAD ATTACHMENT FOR DRILLING TOOLS

Filed June 18, 1963

INVENTOR.
GÜNTER HORST RÖHM
BY
Nolte & Nolte
ATTORNEYS

United States Patent Office 3,244,428
Patented Apr. 5, 1966

3,244,428
HEAD ATTACHMENT FOR DRILLING TOOLS
Günter Horst Röhm, Sontheim (Brenz), Germany, assignor to Rohm-Gesellschaft m.b.H., Sontheim (Brenz), Germany
Filed June 18, 1963, Ser. No. 288,747
Claims priority, application Germany, June 23, 1962, R 32,993
5 Claims. (Cl. 279—60)

This invention relates to a head attachment for drilling tools and more particularly to a head attachment provided with a chuck jaw system.

Drill-gripping chuck jaw systems in drilling tools or the like, whether operated by hand or by machine, have a tendency to loosen with prolonged operation and particularly when the chucks are self-tightening or keyless and the tool is a drilling or boring machine of the percussion type. In percussion boring, the possibility of the chuck loosening up is directly proportional to the impact frequency of the hammer on the bore bit and with frequencies of 9,000 to 12,000 impacts per minute undesired loosening of the chuck jaws occurs very often.

Even with drilling machines that are not of the percussion type but which use self-tightening or keyless chucks, frequent loosening of the chuck jaw system occurs when the drilling machine is stopped suddenly, particularly if the machine is driven by compressed air, and when the drilling machine and particularly the spindle axis thereof is unbalanced causing vibrations in a critical range of angular velocity.

It is accordingly an object of this invention to provide a head attachment for drilling tools in which the tightened chuck jaw system is prevented from loosening much more effectively than in known devices of a similar type.

It is also an object of this invention to provide a head attachment for drilling tools having a self-tightening or keyless chuck in which the driver or dog is prevented from running up on and binding with the body member of the head attachment.

It is another object of this invention to provide a head attachment for drilling tools that can be used with hand-operated or machine-operated drills or borers of either the rotary or percussion types, and also with lathes, milling machines and the like.

It is a further object of this invention to provide a head attachment for drilling tools which is capable of compensating for variation in the frictional force exerted to prevent relative rotation between the main body member of the attachment and the tightening components of the chuck jaw system.

It is a concomitant object of this invention to provide a head attachment for drilling tools which has elastically deformably means that not only prevent loosening of the tightened chuck jaws but also damp the vibrations of the tool.

With these objects in view, the present invention relates to a head attachment for a drilling tool or the like having a spindle, the head attachment comprising a main body member and means for securing the main body member to the spindle. Chuck jaw means are carried by the main body member, and means rotatable with respect to the main body member for selectively tightening and loosening the chuck jaw means are provided. Between the main body member and the rotatable means, there are located means for opposing relative movement therebetween in the tightened condition of the chuck jaw means.

According to another aspect of the present invention, the means opposing relative movement between the main body member and the rotatable chuck jaw system tightening means comprises an elastically deformable annulus or ring consisting of rubber, synthetic material or the like.

According to further aspects of the invention, the elastically deformable annulus is provided between the peripheral surface of the main body member and the inner surface of the rotatable tightening means and/or between a substantially radially extending outer surface portion of the main body member and a substantially radially extending inner surface portion of the rotatable tightening means.

According to additional aspects of the invention, adjusting means are provided for varying the frictional force opposing relative movement between the main body member and the rotatable tightening means and which comprise an adjusting screw directly engageable with the elastically deformable body.

Figure 2:
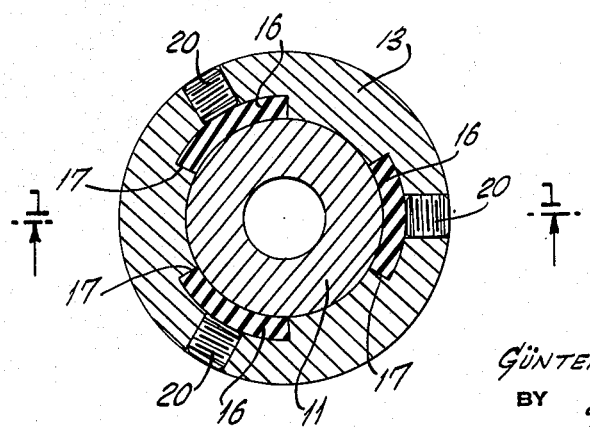

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing in which:

FIG. 1 is a longitudinal sectional elevation of one possible embodiment of a structure according to the preesnt invention taken along line 1—1 of FIG. 2 in the direction of the arrows; and FIG. 2 is a sectional plan view of the structure of FIG. 1 taken along line 2—2 of FIG. 1 in the direction of the arrows.

The head attachment shown in the drawing is of the self-tightening or keyless type of chuck. The main body member 11 is provided with a frustoconical central bore 12 for receiving the spindle of a drilling machine (not shown). Those components which are rotatable relative to the main body member 11 for the purpose of tightening and loosening the chuck jaws 19 consist of the jaw holder 13, the sleeve 14 and the externally threaded bushing 15, these three components being threadedly connected to one another. As is apparent from the drawing, there are situated below the bushing 15, between the latter and a flange of the main body member 11, a plurality of ball members which reduce the friction between the body member 11, on the one hand, and the rotatable assembly made up of the inter-connected elements 13–15, so that in this way these latter elements can turn more easily relative to the main body member 11. An annular groove (not shown) may be formed in the inner surface of the jaw holder 13 and may contain an elastically deformable ring (not shown) of circular cross-section which frictionally engages the peripheral surface of the main body member 11. A driver or dog 18 is threadedly arranged within the main body member 11 and is operatively connected to the chuck jaws 19 in the manner shown in U.S. Patent 1,042,507 so as to operate these jaws in response to axial movement of the driver or dog 18. Thus, the lower portion of the dog 18 is in the form of a disc formed with radial grooves of substantially cylindrical cross section which slidably receive the tenons 21 of mating cross section respectively situated at the top ends of and integral with the jaws 19 which of course are situated in elongated cutouts formed in the jaw holder 13.

The diameter of the ring or arcuate element 16 (FIG. 2) is greater than the depth of the corresponding annular or arcuate groove 17 so that the elastically deformable ring that is made of rubber, suitable synthetic material or the like is compressed between the main body member and the rotatable chuck jaw system tightening members and consequently exert a resilient biasing action therebetween. Of course, instead of a single ring or arcuate elongated elastically deformable element 16 situated in an arcuate groove 17, a plurality of such elements and grooves may be circumferentially distributed about the main body 11. Such a construction is illustrated in the drawing.

The structure includes the provision of means for varying the frictional force opposing the relative movement of the main body member 11 and the rotatable tightening means 13, 14. An adjusting screw 20 is accordingly provided in a suitably threaded bore which permits access by a screwdriver or the like for turning the adjusting screw 20 to compress elastically deformable body 16 which is inserted in a recess 17 in the inner surface of the jaw holder 13 so that the frictional force imparted by the deformed body 16 for preventing relative rotation between the main body member 11 and the rotatable member 13 may be adjustably varied. Thus the elastically deformable body 16 need not be a ring but may be only a small segment of circular cross-section received in a recess 17 of suitable small dimension. A plurality of deformable bodies 16 may be distributed circumferentially around the main body member 1 and may be provided respectively with a plurality of adjusting screws 20 suitably positioned in threaded bores in the jaw holder 13.

Although it has been found in practice that the frictional or arresting force of the elastically deformable means arranged between the main body member of the head attachment and those parts that rotatably tighten and loosen the chuck jaws is sufficient to prevent relative movement therebetween when the jaws are in tightened condition even when there are manufacturing variations in the same material, there are nevertheless rather wide variations in the frictional force exerted particularly by rubber rings. By employing the adjusting screws, the varying tolerances in the frictional forces of the deformable materials such as rubber can be readily compensated for.

It will be understood that each of the elements described above, or two or more together, may also find a useful application in other types of head attachments for drilling tools or the like differing from the types described above.

While the invention has been illustrated and described as embodied in a head attachment for drilling tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A head attachment for a drilling tool or the like having a spindle, comprising a main body member having an outer surface; means for operatively connecting said main body member to the spindle; chuck jaw means carried by said main body member; means coaxial with said main body member and rotatable with respect to said main body member for selectively tightening and loosening said chuck jaw means, said rotatable means having an inner surface in rotary engagement with the outer surface of said main body member, one of said surfaces being formed with at least one elongated, arcuate groove; and an elastically deformable elongated, arcuate member received in said groove and frictionally engaging the other of said surfaces in the tightened condition of said chuck jaw means so as to oppose relative movement between said main body member and said chuck jaw tightening means.

2. A head attachment for a drilling tool or the like having a spindle, comprising a main body member; means for operatively connecting said main body member to the spindle; chuck jaw means carried by said main body member; means rotatable with respect to said main body member for selectively tightening and loosening said chuck jaw means; frictionally opposing means located between said main body member and said rotatable means for frictionally opposing relative movement therebetween in the tightened condition of said chuck jaw means, said frictionally opposing means including an elongated arcuate elastically deformable member engaging said main body member and said rotatable means; and adjusting means for varying the frictional force opposing said relative movement.

3. A head attachment according to claim 2 wherein said adjusting means comprises an adjusting screw engageable with said member and capable of adjustably deforming the same.

4. An attachment as recited in claim 1 and wherein a screw is threadedly carried by said rotatable means and engages said elastically deformable member for adjusting the frictional engagement between said surfaces.

5. A head attachment as recited in claim 1 and wherein said rotatable means threadedly carries a screw one end of which engages said elastically deformable member while adjusting the frictional engagement between said surfaces.

References Cited by the Examiner
UNITED STATES PATENTS

| | | | |
|---|---|---|---|
| 1,042,507 | 10/1912 | Van Ness | 279—60 |
| 2,166,391 | 7/1939 | Borland. | |
| 2,474,556 | 6/1949 | Stone. | |
| 2,553,990 | 5/1951 | Vidal | 279—60 |
| 2,704,681 | 3/1955 | Fischer. | |
| 2,747,948 | 5/1956 | Jergens | 308—187.1 |
| 2,854,238 | 9/1958 | Kennell | 279—19.5 |

ROBERT C. RIORDON, *Primary Examiner.*